United States Patent [19]
Murray

[11] Patent Number: 5,903,775
[45] Date of Patent: May 11, 1999

[54] METHOD FOR THE SEQUENTIAL TRANSMISSION OF COMPRESSED VIDEO INFORMATION AT VARYING DATA RATES

[75] Inventor: Christopher Stephen Murray, Boynton Beach, Fla.

[73] Assignee: International Business Machines Corporation

[21] Appl. No.: 08/659,754

[22] Filed: Jun. 6, 1996

[51] Int. Cl.⁶ .................................................. H04L 25/40
[52] U.S. Cl. ........................... 395/853; 375/370; 375/220
[58] Field of Search ............................. 395/853; 375/370, 375/220

[56] References Cited

U.S. PATENT DOCUMENTS

| | | |
|---|---|---|
| 4,001,504 | 1/1977 | Hendrickson . |
| 4,616,314 | 10/1986 | Wilson et al. . |
| 4,761,800 | 8/1988 | Lese et al. ................................ 375/117 |
| 4,924,456 | 5/1990 | Maxwell et al. ........................... 370/32 |
| 4,953,163 | 8/1990 | Miyamoto et al. ................... 370/100.1 |
| 5,027,400 | 6/1991 | Baji et al. .................................. 380/20 |
| 5,208,831 | 5/1993 | Ueno et al. .................................. 375/7 |
| 5,367,522 | 11/1994 | Otani .......................................... 370/84 |
| 5,603,058 | 2/1997 | Belknap et al. ......................... 395/855 |

OTHER PUBLICATIONS

Ozer, Jan, *Video Compression for Multimedia*, AP Professional, 1995, pp. 8, 364–365.
Moskowitz, David; Kerr, David; et al., *OS/2 Warp, Unleashed*, Sams Publishing, 1995, pp. 752–753.

*Primary Examiner*—Krisna Lim
*Attorney, Agent, or Firm*—R. A. Tomlin; R. V. Davidge

[57] ABSTRACT

A method is provided for allowing the transmission of digital video segments along a number of transmission channels, with the line speed, or rate of transmission in bits per second, being variable during a transmission. For each transmission channel, video data segments are stored in a data buffer, along with data segments known as Write Control Blocks (WCBs). Each WCB includes a pointer to the video data segment with which it is associated and a line speed code indicating the preferred rate of data transmission. The addresses of the WCBs are stored in a FIFO buffer which is established for each transmission channel. When coded information within a WCB indicates that a speed change is needed, a run-time subroutine executing in a co-processor sets bits within a channel control word forming a portion of each WCB to stop a DMA process and to issue an interrupt when the corresponding video segment is to be transmitted. An interrupt handler determines the new line speed and sets a variable speed clock accordingly.

20 Claims, 6 Drawing Sheets

METHOD FOR THE SEQUENTIAL TRANSMISSION OF COMPRESSED VIDEO INFORMATION AT VARYING DATA RATES

CROSS-REFERENCE TO A RELATED APPLICATION

This application is related to a co-pending application filed on Sep. 8, 1994, Ser. No. 302,625, entitled now U.S. Pat. No. 5,668,948, issued on Sep. 16, 1997 entitled "MEDIA STREAMER WITH CONTROL NODE ENABLING SAME ISOCHRONOUS STREAM TO APPEAR SIMULTANEOUSLY AT OUTPUT PORTS OR DIFFERENT STREAMS TO APPEAR SIMULTANEOUSLY AT OUTPUT PORTS," having a common assignee with the present application, which is hereby incorporated for reference in its entirety herein.

This copending application describes a "video-friendly" computer subsystem which enables isochronous data stream delivery in a multimedia environment over traditional television interfaces. A video streamer of this type is optimized for the delivery of isochronous data streams, being able to stream data into new computer networks with ATM (Asynchronous Transfer Mode) technology. This system can be scaled to deliver from one to thousands of independently-controlled data streams to end users. This system can deliver many isochronous data streams from a single copy of data. A mixture of output interfaces and data rates can be accommodated.

BACKGROUND OF THE INVENTION

1. Field of the Invention

This invention relates to providing an ability to vary the data rate at which compressed video information is transmitted, and, more particularly, to varying such a rate in a manner providing the smooth display of video images.

2. Background Information

The playing of motion pictures and other forms of video is generally accomplished using a rather old technology, in which the primary storage media is video tape on which a television signal is recorded in an analog format. This type of storage is used in devices ranging from VHS® VCRs (Video Cassette Recorders) for the home market to the D1 VTRs (Video Tape Recorders), used by television studios and broadcasters, which cost $75,000 to $150,000. In the broadcasting industry, a particular limitation of such expensive equipment arises from the fact that it can only be used to perform one function at a time. Furthermore, the efficiency of the tape process is limited by the labor required to load and unload tapes, and by the accumulation of wear in tape transport units, tape heads, and in the tapes themselves. In particular, analog video tape is difficult to use when a tape has to be edited, as when two or more sources of programming, such as a motion picture and a number of commercials, are to be combined in sequence.

Video, or multimedia, data is generally delivered to end users either by broadcast industry methods or by computer industry methods. Broadcast industry methods generally include the storage of data in the form of analog or digitally recorded tape. Computer industry methods generally provide storage on disks, or on disks augmented by tape, with data being recorded in a compressed digital format.

An important example of such a compressed digital format is found in the MPEG video compression standards, which have been developed by the Motion Picture Experts Group to facilitate the recording of video data on CD-ROM disks and the playback of such data to either a standard television set or a computer system. Without compression, the demands of digital video in terms of video bandwidth and storage capacity are enormous. In an example described by Jan Ozer in Video Compression for Multimedia, AP Professional, p. 8, a typical uncompressed video file has a resolution of 320×240, providing 76,800 pixels in each frame. Thus, to capture each frame with a system using 24-bit color requires about 230 kB (killobytes) or 1.84 Mb (megabits). If this data is captured at a rate of 15 frames per second, which is half the standard rate at which television frame are transmitted, the bandwidth required is 3.456 MBs (megabytes per second) or 27.7 Mbs (megabits per second). However, a double speed CD-ROM drive transfers only about 300 kBs, less that a tenth of the bandwidth required.

As further described by Jan Ozer, ibid., pp. 364–365, a first MPEG standard, now known as MPEG-1, was introduced by the MPEG committee in 1991, with a video standard being built around the Standard Image Format (SIF) of 325×240 pixels at 30 frames per second, with a data rate of 1.5 Mbs (megabits per second). A second MPEG standard, known as MPEG-2, adopted in the spring of 1994, is a broadcast standard specifying playback at 60 frames per second, with data rates ranging from 4 to 16 Mbs. Even when the MPEG-1 standard is otherwise used, the data rate can be varied, with data being transmitted, for example, at 1.544 Mbs, 2.048 Mbs, and 3.0 Mbs. Lower data rates favor the use of a more simple systems for transmitting and decompressing the data, while higher data rates favor use of the system in connection with larger display areas, requiring more pixels of data, with motion picture sequences involving faster and more complex movement, and in applications requiring higher picture quality.

One application for video data compressed according to the MPEG standard, which is becoming increasingly important, is the use of a computer system as a video server providing movies in an MPEG format to a cable television system, which may extend, for example, into rooms throughout a hotel facility or into homes within a residential area. Each television set is connected to such a cable system through a "set-top" box, which may be placed atop the set. Each set-top box converts data received in the MPEG format into a format that can be received by a standard television set, such as the NTSC (National Television Standards Committee) format of North America, Central America, and Japan, the PAL (Phase Alternation Line) format of most of Europe, the Middle East, Africa, and South America, or the SECAM (Sequentiel Couleurs a Memoire) format of France, Russia, and parts of Africa.

One limitation on the use of MPEG data is the expense of its generation, or "capture." According to David Moskowitz and David Kerr, et al., in OS/2 Warp, Unleashed, Sams Publishing, pp. 752–753, the adapter hardware to capture MPEG images costs from $10,000 to $20,000, and service shops typically charge $100 per minute of video to generate MPEG data. This complexity in the generation of MPEG data implies that, while video segments recorded using the MPEG format can be readily joined with one another in an editing process, once a segment has been generated, its format cannot be readily changed, for example, for transmission at another data rate. Thus, a problem is developed whenever there is a need to join sequentially video segments which have been recorded using the MPEG format at differing data rates. That is, while a communication card for use in a computing system has a capability of transmitting MPEG data at various data rates, and while a set-top box receiving such data has a capability of receiving at several data rates, what is needed is a way to transmit segments at different rates sequentially in a manner which appears to be "seamless" or smooth to a person viewing the television monitor associated with the set top box.

DESCRIPTION OF THE PRIOR ART

A number of U.S. Patents deal with changing data rates without disclosing a method for smoothly presenting data at differing rates in a sequential manner. In particular, the problem of presenting packets of compressed video data at sequentially different rates in such a way to allow the generation of a smooth video signal encoded, for example, according to the NTSC format, is not discussed. For example, U.S. Pat. No. 5,367,522 to Otani describes multimedia communication apparatus in which the speed of data transmission is changed in a flexible way depending on the mulitplexed conditions of information other than data type media information to enable smoother multimedia communication. This apparatus is arranged to transmit control data at a low transfer speed and to transfer other media information, such as voice and image at a high speed during the reception of data information. When data information is to be transmitted, a first selection means selects an optimum maximum transfer speed of the data information, depending on the sort of data information and on the multiplexed condition of types of media information other than the data information. A second selection means selects a necessary minimum transfer speed depending on the sort of data information. Furthermore, U.S. Pat. No. 4,924,456 to Maxwell, et al., describes a modem having a data transmission protocol involving lower-speed, full-duplex operation during the sequence of connecting with a remote modem, and an automatic switch to higher-speed, half-duplex operation for data transfer. Further, the modem data transmission involves transparently changing between lower-speed, interactive operation and higher-speed operation based upon data transmission demands, with operation being controlled by a processor monitoring the contents of a transmit data buffer and providing a mode control command to the modem transmitter.

Other examples from the patent art are concerned particularly with switching transmission interfaces, or modems, to match the rates at which signals are transmitted. For example, U.S. Pat. No. 4,761,800 to Lese, et al., describes an asynchronous interface for coupling data between a terminal and a data module. The interface determines the rate of data being transmitted by configuring counting circuitry therein for measuring the period of a start bit in the first received character whenever the speed of data being transferred must be determined. The interface then adjusts to the newly-determined data rate, receiving the remaining bits in the first character and in subsequent characters at the new rate. Also, U.S. Pat. No. 5,208,831 to Ueno, et al., describes a network interface system which is able to connect automatically to respective network stations having different data transfer speeds, using a detector and selector provided within the interface.

The reception of self-clocking asynchronous data is considered in U.S. Pat. No. 4,616,314 to Wilson, et al., which describes a data receiver including a microcomputer, coupled to a bus having three signal lines. Bits of a data block are detected by a first exclusive-OR gate coupled to first and second of these signal lines. An interrupt control signal and the output of the first exclusive-OR gate are coupled to a second exclusive-OR gate that generates an interrupt signal coupled to the interrupt input of the receiving microcomputer, which, being interrupted in response to a data bit, then changes the binary state of the interrupt control signal for producing an interrupt for the idle state between data bits. Upon being interrupted by the idle state between data bits, the receiving microcomputer changes the binary state of the interrupt data bit and also applies a bit of return data to the third data line. The received data block may include an address and a data portion.

The sequential transmission of program and commercial segments is considered in U.S. Pat. No. 5,027,400 to Baji, et al., which describes a multimedia bidirectional broadcast system including a broadcast station and subscriber terminals. Transmission occurs over through an ATM (Asynchronous Transfer Mode) exchange over a broadband ISDN (Integrated Services Digital Network), which is a form of a world-wide network evolving from the present telephone networks, or over a cable television system. The broadcast station includes a program transmitter, which accesses a program data base to transmit program data, such as motion pictures, commercial transmitter, which accesses a commercial data base to transmit the content thereof. Alternating operation of the program and commercial transmitters is achieved through the use of settings developed within a main control unit. Under certain conditions, the subscriber determines which commercial he views, independently from his selection of program material. The program information may include an index indicating when a commercial may be inserted. While the combination of motion picture program information with a still picture commercial is considered, the sequential transmission of compressed motion picture data and commercial data at different data rates is not considered.

SUMMARY OF THE INVENTION

In accordance with one aspect of the invention, there is provided a method for transmitting video data arriving in a number of digital video data segments including digitally encoded transmission speed information. The video data segments arrive in a preferred sequence reflecting the sequence in which they are to be transmitted. The method includes storing each video data segment within a data buffer, constructing a number of data structures, each of which corresponds to a video data segment, reading information from each data structure in an order corresponding to the preferred sequence, and, when a change in transmission line speed is required, as indicated by the line speed code within a particular data structure corresponding to a video data segment to be transmitted next, setting a variable speed clock to provide pulses timing transmission of the video data. Each data structure, which is stored in the data buffer, includes a pointer to the video data segment corresponding to the data structure and a line speed code derived from the encoded transmission

DETAILED DESCRIPTION

Figure 1:
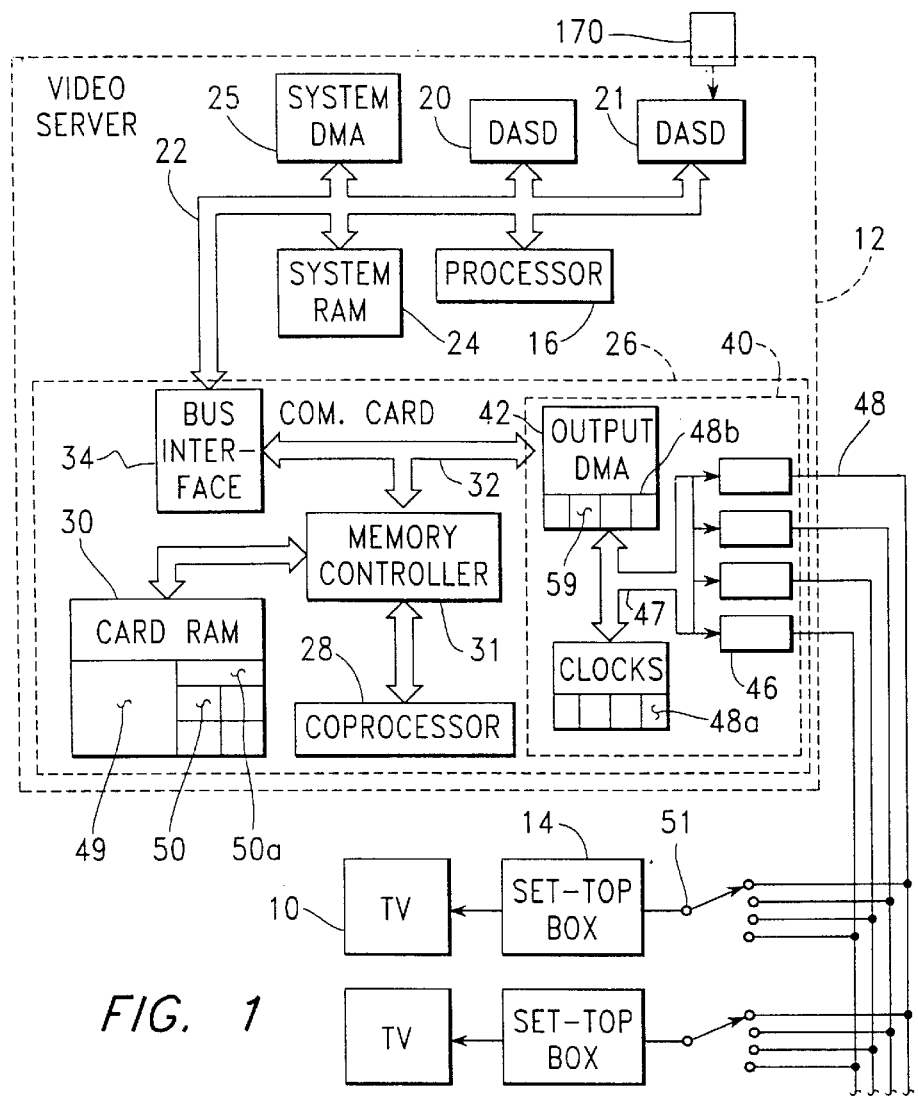
FIG. 1 is a schematic block diagram of a network in which the present invention is applied.

FIG. 1 is a block diagram of a network in which the present invention is applied. Motion pictures are distributed to a number of television sets 10 from a video server 12, composed of a computing system, through a set-top box 14 connected to each television set 10.

Each set-top box 14 may be, for example, the Stellar 1000 Interactive Digital Video Terminal, sold by Stellar One Corporation® of Seattle, Wash. This unit operates with an MPEG 1, MPEG 1+, or MPEG 2, input, providing an input in the NTSC or PAL format. The input may be T1 1.544 Mbs, E1 2.048 Mbs, or ADSL-3 6.4 Mbs.

The video server 12 includes a number of conventional elements, such as a processor 16, DASD (Direct Access Storage Device) devices 20, 21 and a system bus 22. The DASD devices 20, 21 may include a magnetic memory device, such as hard-file or a floppy diskette file, and a CD-ROM (Compact Disk, Read Only Memory) drive. Also connected to the system bus 22 are system RAM (Random Access Memory) memory 24 and a system DMA (Direct Memory Access) circuit 25, which controls access to the system memory 24. To achieve the data rates needed for operation with the present invention, the system bus 22 is preferably an IBM Micro Channel® bus or a PCI (Peripheral Component Interconnect) bus.

A communications card 26 is also connected to the system bus 22 to provide advanced communication features. This communications card 26 may be, for example, an IBM ARTIC960 (A Real-Time Interface Coprocessor) adapter card, having a coprocessor 28 and card RAM memory 30 connected to a memory controller 31, which is in turn connected to a CFE bus 32 (Common Front End), which is in turn connected to the system bus 22 through a bus interface circuit 34. The CFE bus 32 also extends onto an application interface card 40, being connected thereupon to an output DMA circuit 42.

The application interface card 40, which is connected to the communications card 26 as a daughter card, includes, depending on the type of application interface card 40, four (as shown), eight, or sixteen output ports 46, each of which is driven through an AIB bus 47 (Application Interface Bus) extending from output DMA circuit 42. Each output port 46 is connected to an output line 48. A variable-speed clock circuit 48a is also associated with each of the output ports 46. Each clock circuit 48a has associated therewith a driver enable register (not shown), which is accessed by the coprocessor 28. This driver enable register includes one or two bits, depending on the number of different clock speeds to be selected, which is/are set to determine the speed of the clock. The output DMA circuit 42 drives video data stored within card RAM memory 30 through each of the output ports 46 when a pulse is driven from its associated clock circuit 48a. Output DMA circuit 42 also includes a resident RAM memory 48b, which is used for the temporary storage of control words used the control the passage of data through each output port 48.

Card RAM memory 30 includes a data buffer 49 which is used for temporary storage of video and control data, and, for each channel associated with an output port 46, a FIFO buffer 50 and a pointer buffer 50a. The buffering capability provided with data buffer 49 allows the rate at which data is sent to communications card 26 to vary from the rate at which data is transmitted from output ports 46. As data is read from data buffer 49, memory controller 31 must assure that data is written into the memory 30 at a rate sufficient to prevent the memory 30 from emptying, so that data is not available when needed. Also, data must not be written into memory at a rate causing an attempt to overfill card RAM memory 30, so that data will be lost.

Thus, during operation of the system of FIG. 1, data consisting of sequential segments of programming, such as motion pictures, and commercials, are read from DASD devices 20, 21, and provided as sequential outputs on the four output lines 48. Each set-top box 14 is alternately connected to each of these output lines 48 through a channel selector switch 51, so that each subscriber can view a television picture derived from information driven along any one of the output lines 48 at any time. As previously described, while the application interface card having only four output ports 46, shown in FIG. 1, may be replaced with a application interface card having instead 8 or 16 output ports, providing each subscriber with a greater choice of channels. Furthermore, two or more communications cards 26 may be installed in slots connecting with the system bus 22 within computer system 12, with a capability limit for the system being reached as the capacity of the system bus 22 is reached.

Figure 2:
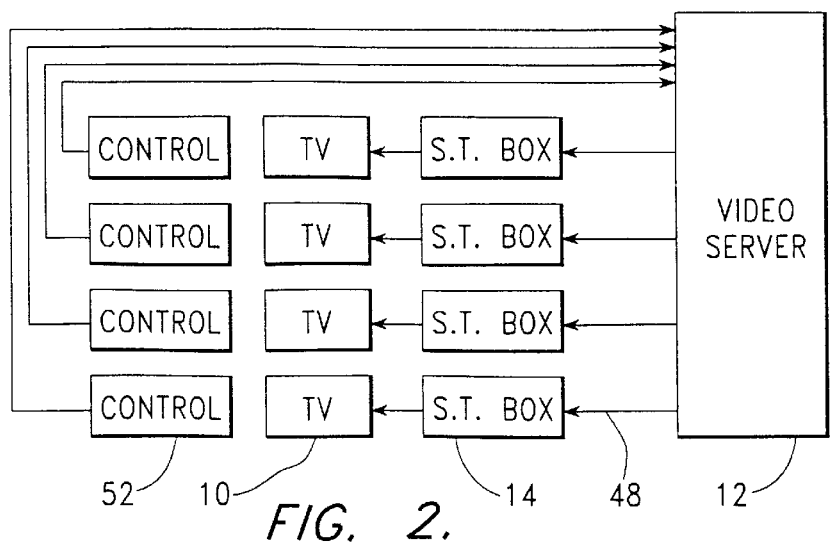
FIG. 2 is a schematic block diagram of an alternative network in which the present invention is applied.

FIG. 2 is a block diagram of an alternative network in which the present invention is used. The computing unit 12, which is used as a video server, is as described in reference to FIG. 1. Each of the output lines 48 is connected to a set-top box 14, which is in turn connected to a television set 10. In other words, each set-top box 14 is wired to an individual output port 46 (shown in FIG. 1) of the video server 12. A control box 52 is associated with each television set 10, providing inputs to the video server 12. The outputs of each control box 52 provide channel selection data, so that selected programming is provided through a particular output line 48, and other controls, which may provide functions of starting, stopping, and reversing the presentation of video information. Again, up to sixteen output lines 48 may be provided from a single communication card 26 (shown in FIG. 1), and more than one such card may be included in the video server 12.

Figure 3:
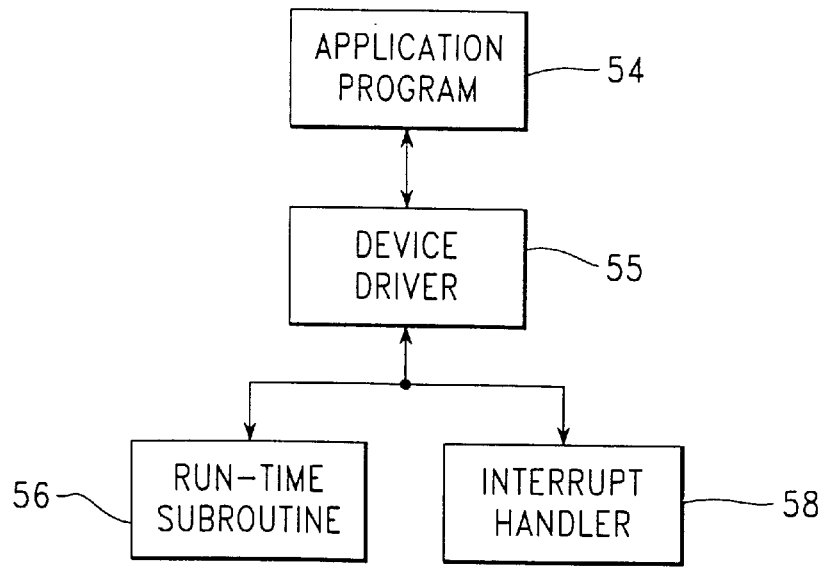
FIG. 3 is a schematic block diagram of an application program executing in a coprocessor within a video server of the network of FIG. 1.

FIG. 3 is a schematic block diagram of an application program 54 executing within coprocessor 28 (shown in FIG. 1). This application program 54 includes a device driver 55 used to facilitate the transmission of video data through the output ports 46 (also shown in FIG. 1). The device driver 55 includes a run-time subroutine 56, which executes during run-time, and an interrupt handler 58, which executes when an interrupt is being handled.

Figure 4:
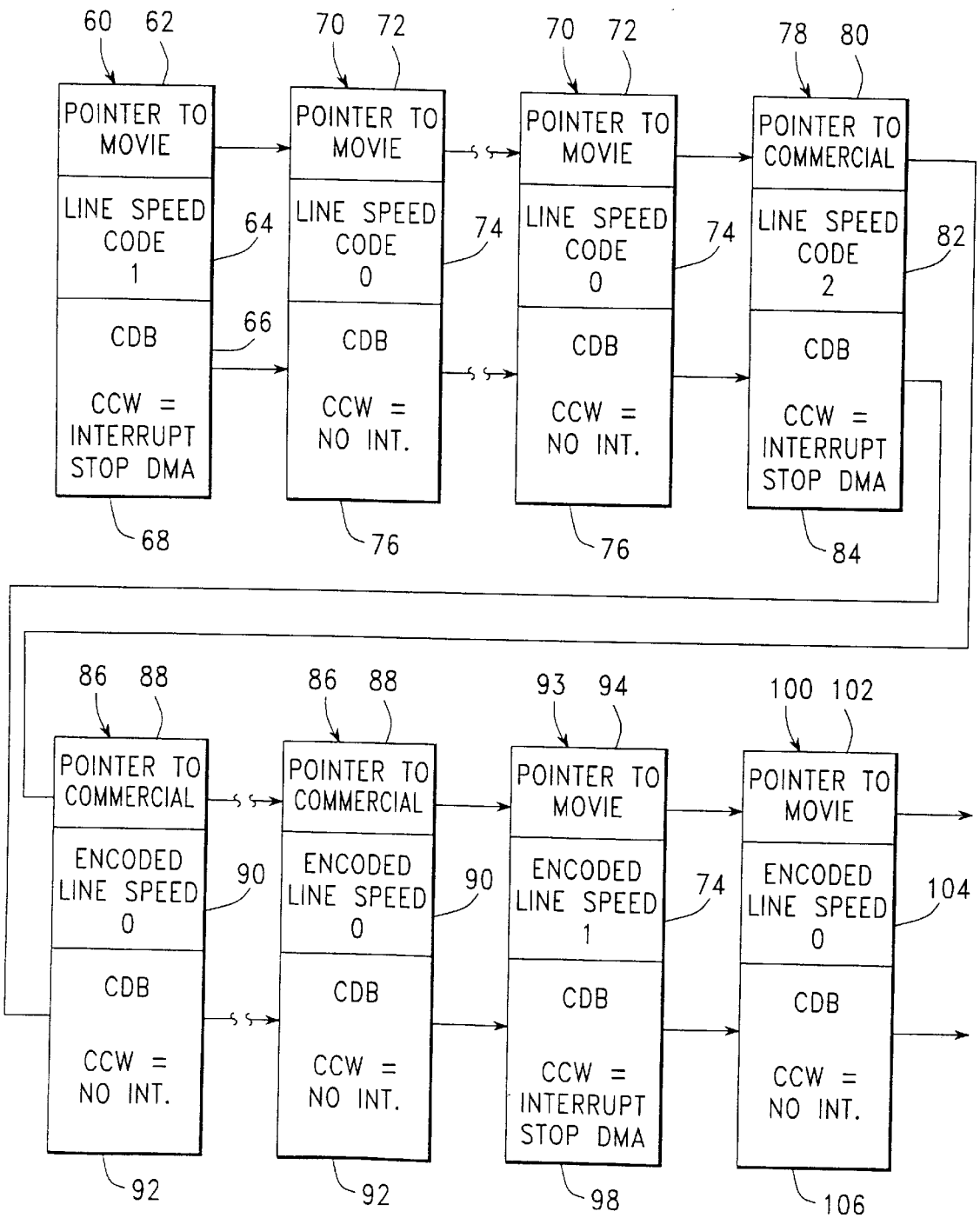
FIG. 4 is a schematic block diagram of data structures used to control the output of video data through a single output port of the video server of the network of FIG. 1.

FIG. 4 is a schematic diagram of a number of WCBs (Write Control Blocks), of which WCB 60 is exemplary, used to control the output of video data through a single output port 46 (shown in FIG. 1), showing particular parameters associated with a first portion of a motion picture, followed by a commercial at a different data rate, followed in turn by a second portion of the motion picture, The general flow of video data and associated control information into data buffer 49 will now be discussed, with continuing references to FIGS. 1 and 4. Each video data segment has been recorded in a compressed manner using, for example, the MPEG-1 format. Video data segments typically have a size of one byte less than 64 Kbytes, thereby avoiding problems associated with using a full 64 Kbytes, but including control information identifying, for example, the channel, or output port 46, through which the data is to be transmitted, the line speed at which it is to be transmitted, and the length of the video data segment itself. Video data segments are stored in either or both of the DASD devices 20, 21, in a form which may be read into system RAM memory 24 through an application program executing in processor 16. Data from the video data segments intended for each output channel (i.e. for transmission through each of the output ports 46), is sent, under control of the application program executing in the system processor 16, in the correct sequential order through system bus 22 to the communications card 26.

The application program 54 executing in coprocessor 28 stores the video data structures in the data buffer portion 49 of card RAM memory 30, generating a WCB, such as WCB 60, for each video data segment. Each WCB is a data structure including a number of parameters used to describe what is to be done with a particular segment of video data associated with the WCB. In general, multiple channels are in use simultaneously, with the video data segments and of various channels being interspersed, but with the control information associated with each video data segment being available to determine the channel to which each such segment will be directed. As application program 54 generates each WCB, it uses the data identifying the particular channel to which the video data segment is to be sent to develop a variable called "devhandle," (device handle) which identifies this channel.

The present invention provides a particular process allowing the sequential transmission of video segments at different line speeds (or data rates). Thus, the data of each WCB includes a variable "bitratetrans," which identifies the line speed at which the video segment associated with the WCB is to be transmitted. The WCB associated with the first video data segment, at the beginning of a video transmission, or with the first video data segment after a speed change has a "bitratetrans" variable with a non-zero value determined according to the desired line speed. The WCBs associated with other video data segments have "bitratetrans" variables with zero values, indicating that the line speed should not be changed.

At the communications card 40, knowledge of the sequence in which the video data segments arrive, together with knowledge of the output channel associated with each video data segment is sufficient to determine how WCBs and video data segments should be ordered for transmission of the video data through each output channel, with application program 54, running on coprocessor 28, receiving and storing the video data segments within data buffer 49, so that this memory can be used as a buffer in the process of video transmission. Thus, under the control of application program 54, as the data from each video data segment is individually stored within data buffer 49, a WCB corresponding to the video data segment is written and stored in another part of data buffer 49. Also, the address at which each WCB is stored is written to the address FIFO buffer 50 forming another part of card RAM memory 30. These addresses are stored, and are later retrieved, in the order in which the corresponding video data segments are received. Also, the associated address, at which the video data segment corresponding to WCB is stored, is written to the WCB data in the form of a "*writebuffer" pointer. In this way, each FIFO buffer 50 is filled with the addresses of WCBs associated with video data segments to be transmitted through the output port 46 associated with the FIFO buffer 50, with these addresses being ordered in the sequence of the video data segments Since video data segments are also allowed to vary in length, application program 54 also writes the length of each video data segment, as derived from the control data stored as a part of the video data segment, within the data of the WCB associated with the video data segment, in the form of a "length" variable. However, as a practical matter, most WCBs are equal in length to the maximum length which can be transferred by the output DMA circuit 42, such as 64 K-1 bytes.

The detailed content and use of data structures, such as WCB 60, will now be discussed, with continuing reference to FIGS. 1, 3, and 4. The functions of DMA circuit 42 are divided among a number of channels of equal priority, with each channel driving data through one of the output ports 46. Thus, depending on the type of application interface card 40, there may be four, eight, or sixteen channels. Each channel is controlled associated registers 59, including a 32-bit CCR (Channel Control Register), the internal memory structure 48b of the DMA circuit 42. In the process of programming the output DMA circuit 42 to transmit a single video data segment on a channel, a CDB (Channel Descriptor Block) is developed and written into the registers 59 associated with that channel. As shown in the example of WCB 60, each WCB includes a pointer 62 providing the address of associated video data stored within data buffer 49, a line speed code 64 indicating the line speed at which video data is to be provided as an output, and the CDB 66. Each CDB 66 includes a CCW 68 (Channel Control Word) which shows a particular action to be taken by the output DMA circuit 42.

TABLE 1

Structure of a CDB (Channel Descriptor Block)

```
struct cdb {
    RIC_ULONG   dmabytecount;    /*bytes transfered   */
    RIC_ULONG   op1readdata;     /*AIB bus data read  */
    RIC_ULONG   op2readdata;     /*AIB bus data read  */
    RIC_ULONG   aibopaddr;       /*AIB address        */
    RIC_ULONG   op1writedata;    /*AIB bus data       */
    RIC_ULONG   op2writedata;    /*AIB bus data       */
    RIC_ULONG   memptr;          /*pointer to memory  */
    RIC_ULONG   dmaiolen;        /*byte to transfer   */
    RIC_ULONG   chainpointer;    /*chain of CDBs      */
    RIC_ULONG   channelctrl;     /*channel control word */
```

TABLE 1 shows the definition of the structure of each CDB, in which "RIC" indicates that a parameter is being defined for the ARTIC Interface Coprocessor. The variable "dmabytecount" gives the number of bytes transferred into the previous CDB by output DMA circuit 42. The variables "op1readdata," "op2readdata," "albopaddr," "op1writedata," and "op2writedata" are not used in this data transmission operation, but are filled in with zeroes to maintain the positions of information within the CDB 66. The variable "memptr," which is indicated as pointer 62 in FIG. 4, points to the video data within data buffer 49 associated with the present CDB 66. The variable "dmaiolen" indicates the number of bytes in the buffer to be transferred. The variable "chainpointer" points to the next CDB in data buffer 49. The variable "channelctrl," indicated as the CCW (Channel Control Word) in FIG. 4, shows the action to be taken by the output DMA circuit 42.

TABLE 2

Structure of a WCB (Write Control Block)

| | | | |
|---|---|---|---|
| struct rcss__i__write | | | |
| RIC__ULONG | cmd; | /*function code | */ |
| RIC__PROCESSID | processid; | /*calling process id | */ |
| RIC__ULONG | devhandle; | /*device handle | */ |
| RIC__ULONG | retcode; | /*return code | */ |
| RIC__ULONG | reqint; | /*interrupt requested | */ |
| struct rcss__i__write | write *nextptr; | /*pointer to next element on queue | */ |
| RIC__ULONG | writestatus; | /*status bits | */ |
| RIC__ULONG | writecount; | /*number of characters written | */ |
| unsigned char | *writebuffer; | /*addr of appl output buffer | */ |
| RIC__ULONG | length; | /*time to complete write | */ |
| unsigned char | typewrite; | /*type of write | */ |
| unsigned char | typepost; | /*used to notify processor | */ |
| unsigned char | bitratetrans; | /*bits/sec to transmit | */ |
| unsigned char | reserved1[9] | /*reserved for future | */ |
| struct cdb | cdb; | /*write channel descriptor block | */ |
| struct cdb | dummycdb; | /*dummy block | */ |
| struct rcss__i__write | *cnextptr; | /*ptr to next elem on complete Q | */ |
| unsigned char | ioproc | /*used by iscs | */ |

TABLE 2 shows the definition of the structure of each WCB 60, in which the "cmd" variable provides a function code indicating the type of action to be taken. Examples of such actions include open, close, shutdown, and reset. The variable "processid" identifies the process calling the driver to determine if it has permission to use the port. The variable "devhandle" identifies the channel (or output port 46) through which the video data segment associated with the WCB is to be transmitted. The variable "retcode" is filled in by the driver in the event an illegal operation is requested. The variable "reqint" means that an interrupt is requested. The pointer "*nextptr* points to the next WCB, providing the linking between WCBs. The variable "writestatus" is filled in by the driver if an error occurs, such as an underrun. The variable "writecount" is also filled in by the driver, telling the user the number of characters written. The pointer "writebuffer" points to the video data associated with this particular WCB in data buffer 49. The variable "length" indicates the number of characters to write. The variables "typewrite" and "typepost" are not used.

The variable "bitratetrans," indicated as Line Speed Code 64 in FIG. 4 indicates the rate at which transmission of the video data associated with the WCB is to occur. A line speed code value of one indicates that the video data is to be transmitted at 1.544 Mbs. A line speed code value of two indicates that the video data is to be transmitted at 2.048 Mbs. A line speed code value of three indicates that the video data is to be transmitted at 3.088 Mbs. A line speed code value of zero indicates that the line speed is to be that of the previous WCB. Thus, a non-zero line speed code is typically given only when a change in line speed is to be made.

The variable "reserved1[9]" is not used. The variable "cdb" indicates that the CDB (Channel Descriptor Block) is to be written. The variable "dummycdb" is a dummy cdb which stops the output DMA circuit 42 if a pointer to the next CDB, "nextptr" has not been written. This "dummy-cdb" feature is used under certain error conditions and at the end of a video program. The variable "ioproc" is not used.

In the example of FIG. 4, a first motion picture segment corresponds to a first WCB 60, including a pointer 62 to the first movie data in data buffer 49. The line speed code 64 of this WCB 60 has a value of 1, indicating that a line speed of 1.544 Mbs is to be used. The CCW 68 of this WCB 60 is set to require that an interrupt be issued, stopping output DMA circuit 42 if it is running, so that the process can be initialized. The transmission of data from this motion picture segment is continued with a number of WCBs 70, each of which has a pointer 72 to movie data and a line speed code 74 of zero, indicating that the line speed is not to be changed, so that the CCW 76 is set to require no interrupt.

Following this first motion picture segment, a commercial segment having a higher line speed, or data rate, is presented. The beginning of this commercial segment is indicated by a WCB 78 including a pointer 80 to the first video data for this commercial segment. A line speed code 82 of two indicates that video data is to be transmitted at a rate of 2.048 Mbs. The CCW 84 is set to require an interrupt and to stop the output DMA circuit 42 to accommodate a required change in line speed. The transmission of data from this commercial segment is continued with a number of WCBs 86, each of which has a pointer 88 to commercial data and a line speed code 90 of zero, indicating the line speed is not to be changed, so that the CCW 92 is set to require no interrupt.

Following this commercial segment, a second motion picture segment is started by a WCB 93 having a pointer 94 to the first video data from this second segment. The line speed is returned to 1.544 Mbs, with a line speed code 96 having a value of one. Since the line speed is changed, the CCW 98 is set to request an interrupt and to stop the output DMA circuit 42. This motion picture segment is continued with a number of WCBs 100, each of which has a pointer 102 to the next data from the motion picture, and a line speed code 104 equal to zero, so that the line speed is not changed. The CCW 106 is set to require no interrupt.

Figure 5:
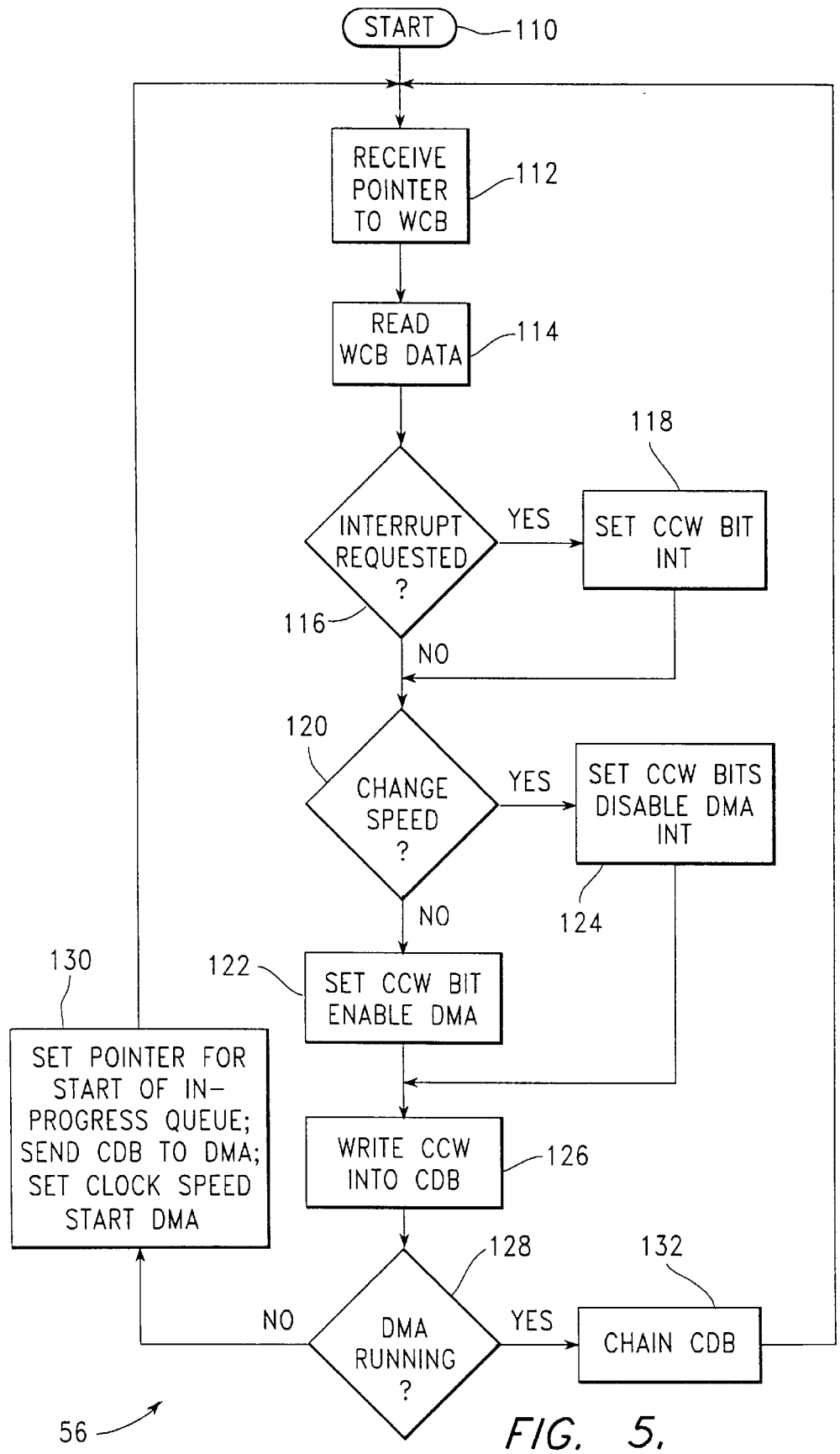
FIG. 5 is a flow chart of a run-time subroutine forming part of the application program of FIG. 3.

FIG. 5 is a flow chart of the run-time subroutine 56 within the application program 54 (shown in FIG. 3) running in coprocessor 28 (shown in FIG. 1).

Referring to FIGS. 1, 3, and 5, a portion of the application program 54 running above the run-time subroutine 56 is responsible for reading the addresses from each of the FIFO buffers 50 during run-time of the application. When this run time starts, the run-time subroutine 56 begins in start block 110, waiting for an address to be received from any of the FIFO buffers 50. After such an address is received in block 112, in block 114, the subroutine 56 reads the WCB data at the address. Next, in decision block 116, this data is examined to determine if a flag bit has been set to indicate that an interrupt has been requested. This flag bit represents the value of the "reqint" variable of TABLE 2. If this bit is set, indicating that an interrupt has been requested, in block 118, the "int" bit is set in the CCW (Channel Control Word) portion of the WCB. If the interrupt flag bit is not set, nothing is done, as the "int" bit in this portion has already been reset.

In either case, the WCB data is next examined, in decision block 120, to determine if a line speed change is desired. This determination is made by examining the bits associated with the "bitratetrans" variable of TABLE 2. If this variable has a zero value (which it cannot have at the beginning of a transmission) a speed change is not required, and, in block 122, a bit is set in the register in which the CCW is formed to enable output DMA circuit 42. On the other hand, if the "bitratetrans" variable has a non-zero value, in block 124, the "int" bit and a bit to disable output DMA circuit 42 are set in the CCW register. In either case, the CCW has been completed by this time, so, in block 126, it is written into the CDB (Channel Descriptor Block) associated with the particular output channel identified by the "devhandle" variable of TABLE 2, which is part of the WCB.

Next, in decision block 128, a determination is made of whether output DMA circuit 42 is running. At this point, this DMA circuit 42 should be running, except on the first frame of a program presentation, when it has not yet been turned on for the particular channel identified by the "devhandle" variable of the WCB currently being considered. Therefore, if this DMA circuit 42 is found not to be running, it is turned on in block 130. Also in block 130, since the current WCB has been determined to correspond to the first video segment of a program presentation, the clock speed is set according to the value of the "bitratetrans" variable of TABLE 2.

As previously described, the DMA circuit 42 must be programmed by writing a CDB, having the structure shown in TABLE 1, into the registers 59 associated with the channel over which transmission of the video segment associated with the CDB is to occur. In the case of the first video segment of a program presentation, the CDB of the WCB is written into the registers 59 in block 130 of the run-time subroutine 56. The WCB associated with this first video segment also becomes the first element in an "in-progress" queue, subsequently containing other WCBs which have gone through the processes of the run-time subroutine 56. Also in block 130, so that the beginning of this in-progress queue can subsequently be found, a start of in-progress queue pointer indicating the address of the WCB associated with the first video segment is written to the pointer register 50a of card RAM memory 30.

If the DMA is determined in block 128 to be running, the run-time subroutine 56 continues to block 132, where the WCB being currently considered is chained into the in-progress queue. To allow this chaining, the run-time routine 56 temporarily stores the address of each WCB it uses. When block 132 is reached, the run-time routine 56 writes the address of the WCB currently being handled in the data structure, within data buffer 49, of the previously-handled WCB, as the pointer "chainpointer." In this way, the in-progress queue is formed, containing the WCBs which have been processed through run-time routine 56, with each next element in the queue being identified by the pointer "chainpointer." In the case of the first WCB at the start of a presentation, which has been identified in decision block 128 by the fact that the output DMA circuit 42 is not running, since this WCB must be the first element in a new in progress queue, the processes of block 132 are not required. In either case, run-time subroutine returns from block 130 or block 132 to wait for the next WCB to be received at block 112.

As WCBs are chained together into the in-process queue in block 132, the video data segments corresponding to each of these WCBs are made available to output DMA circuit 42 for transmission through the appropriate output ports 46. The output DMA circuit 42 drives video data segments through each output port 46, with the timing for such transmissions being derived from pulses provided by the variablespeed clock 48a associated with that particular output port 46. The CDB (Channel Descriptor Block) associated with each video data segment being transmitted through a channel is written to the registers 59 associated with the channel. The structure of each CDB, which forms part of a WCB, has been discussed in reference to TABLE 1.

For each channel, when the associated variable-speed clock 48a provides a timing pulse, the DMA circuit 42 transmits the video data segment found at the address within data buffer 49 determined by the bits within the corresponding register 59 defining the variable "memptr" of the CDB therein. The next WCB is located by the bits within the registers 59 defining the variable "chainpointer" of the CDB therein. As the video data segment associated with a CDB is transmitted, the next CDB is read into the registers 59. When the transmission of the video data segment is completed, the number of bytes transferred is written into the "dmabytecount" variable of the next CDB, being stored within the next WCB in data buffer 49. Before this value is written, the variable "dmabytecount" has a value of all F's, the highest possible value. If the output DMA circuit 42 loads a CDB having a CCW with a value of zero, it stops, since it has reached beyond the completed que to a CDB corresponding to a WCB which has not yet been processed by the run-time subroutine 56.

When necessary, output DMA circuit 42 stops running and transmits an interrupt, which may be, for example, due to an error condition, or due to a need to change the line speed. When there is a need to change line speeds the CCW (Channel Control Word) includes bits, written in block 124 of run-time program 56 (shown in FIG. 5), indicating that the DMA is to be disabled and that an interrupt should be taken. When the DMA circuit 42 reads these bits, it stops running and transmits an interrupt. When a change in line speed is required, DMA circuit 42 reacts to the "int" and "disableDMA" bits without knowing the reason why they have been set by run-time subroutine 56.

Figure 6:
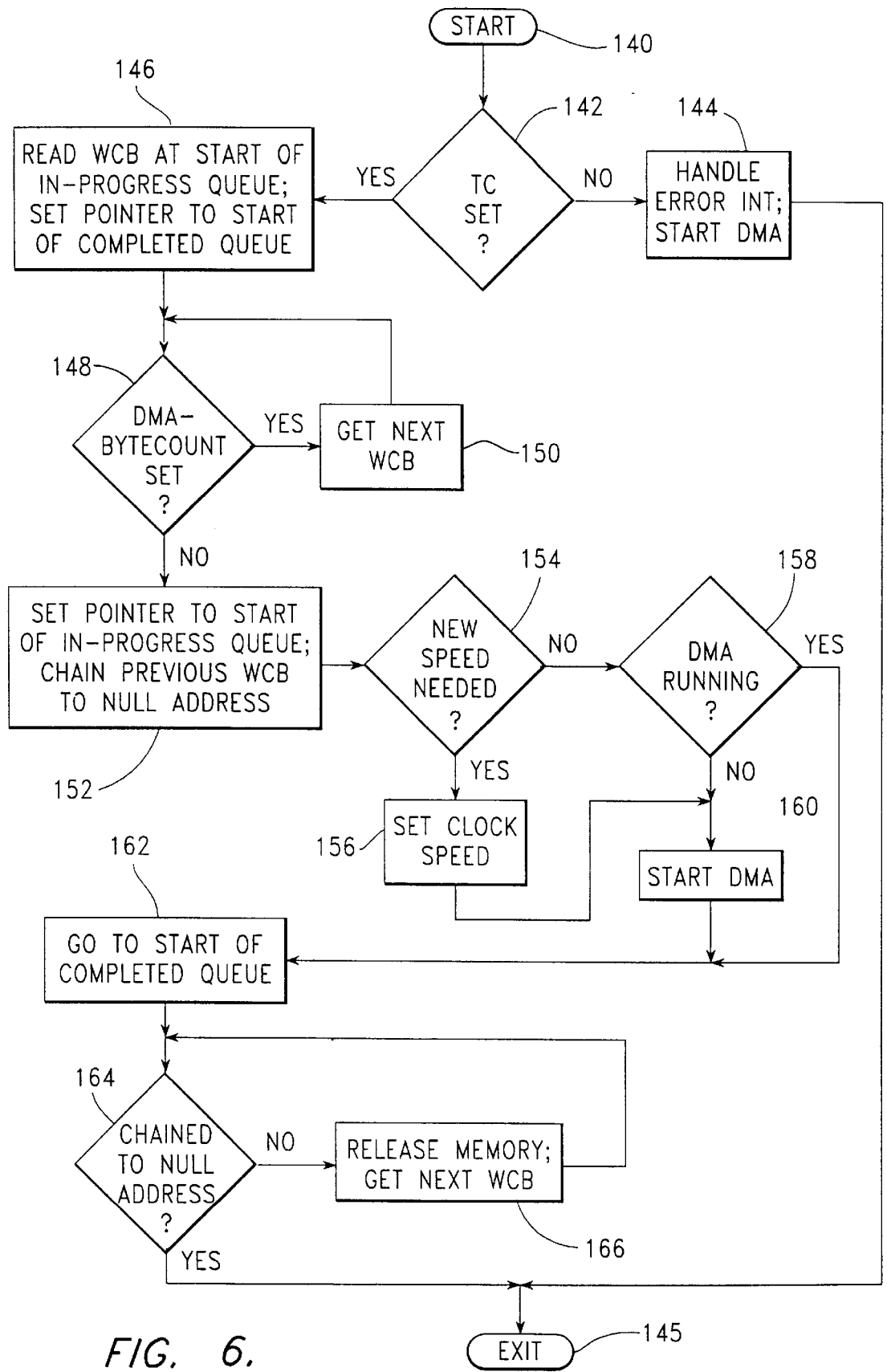
FIG. 6 is a flow chart of an interrupt handler forming part of the application program of FIG. 3.

FIG. 6 is a flow chart of the interrupt handler 58 running under application program 54 (shown in FIG. 3). While the run-time subroutine 56, described above in reference to FIG. 5, is used to process WCBs in association with the transmission of video data, other functions cannot be handled during run-time and are therefore allowed to occur during the operation of interrupt handler 58. These other functions include changing the clock speed associated with transmission so that subsequent blocks of video data are transmitted at a different line speed, handling error interrupts, and releasing the memory associated with WCBs which have been processed by the run-time subroutine 56.

Referring to FIGS. 1, 3, and 6, interrupt handler 58 begins in start block 140 when an interrupt is issued by output DMA circuit 42. During the transmission of data, the output DMA circuit 42 counts of the number of bits of data actually transmitted, counting down from the number of bits it has been assigned to transmit. When this number reaches zero, the terminal count bit is set, indicating the successful completion of a portion of a video transmission. However, if an error condition occurs before this portion of the video transmission is complete, the output DMA circuit 42 issues an error interrupt, starting interrupt handler 58 before the terminal count bit is set. In this case, following the examination of the terminal count in decision block 142, the error interrupt is handled in block 144. Since the DMA circuit 42 has stopped to issue an error interrupt, this circuit is also restarted in block 144, completing the actions required of the error handler 58, which then proceeds to exit block 145.

On the other hand, if an interrupt is issued when the terminal count has been set, there is no need to handle an error interrupt, so the interrupt must be needed to handle various other functions. The first part of interrupt processing under this condition is concerned with placing those WCBs from the in-progress queue which are associated with video data segments that have been transmitted over the associated output port 46 onto a completed queue, so that the memory space occupied by these WCBs in data buffer 49 can be turned back for other uses. Thus, if the terminal count is set, as determined in decision block 142, the interrupt handler 58 examines, in block 146, the WCB identified a pointer to the start of the "inprogress" queue. This pointer has been stored in the pointer register 50a of card RAM memory 30. Since the WCBs in this queue have been chained together into a linked list in block 132 of run-time subroutine 56, this list can be easily traversed.

Proceeding along this list, for each WCB, a decision is made in decision block 148 by examining the "dmabytecount" variable of the next WCB in the list, which is found through the use of the "nextptr" variable of the present WCB. If this "dmabytecount" variable has been set to a value other than all "F"s, it is known that the video data associated with this WCB has been transmitted, so data from the next WCB is read in block 150 to be examined in decision block 148. This process is continued until a WCB having a "databytecount" variable equal to all "F"s is encountered at decision block 148. At this point, in block 152, the linkage between elements in the list of WCBs is broken by writing a null address (all zeroes) for the variable "*nextptr" in the WCB prior to the current WCB, i.e. in the last WCB corresponding to video data which has been transmitted. In the pointer register, the pointer to the start of in-progress queue is moved to the current WCB, so that this process of evaluating WCBs in the in-progress queue will subsequently begin an the point where it is now ending.

After the processes of block 152 are completed, the current WCB, which is presently the first WCB not used by output DMA circuit 42 to transmit associated video data through an output port 46, is examined to determine whether the interrupt starting the interrupt handler 58 was issued because the output DMA circuit 42 has determined that a line speed change is required. This determination is made, by examining the "bitratetrans" variable of the WCB, which has been explained in reference to TABLE 2. If this variable has a non-zero value, its value is used in block 156 to set the speed of the variable-speed clock 48a associated with the current output channel. If these bits have not been set, and are therefore all zero, a new clock speed is not needed.

If a new speed is set, it is known that the DMA circuit 42 has been stopped, so it is restarted in block 160. Otherwise, the interrupt handler 58 proceeds to decision block 158, where a determination is made concerning whether output DMA circuit 42 is running. If the DMA circuit 42 is not running, it is started in block 160.

When the data from WCBs is used as described above, the WCB data structures remain in the data buffer 49. If the buffer space occupied by these data structures were not returned to the application program 54 running above the run-time subroutine 56, data buffer 49 would quickly be filled, so that new WCBs could not be brought in. Thus, a remaining process in interrupt handler 58 is used to return the memory associated with those WCBs which have been placed in the completed queue for other uses. This process begins in block 162, as the interrupt handler 58 goes to the start of the completed queue, using the pointer which was set in pointer register 50a in block 146. Next, the list of WCBs is traversed, with each next WCB being determined by examining the variable "cnextptr" in the current WCB. If this variable has been set to an address other than the null value, as determined in decision block 164, the memory in data buffer 49 associated with the current WCB is released in block 166. This includes both the memory used to store the WCB and the memory used to store an associated video segment, as located by the variables "*writebuffer" and "length" in the current WCB. Also in block 166, the next WCB is accessed.

When a WCB having the variable "cnextptr" set to a null value is examined in decision block 164, it is known that the end of the completed queue has been reached, so the memory associated with this block is not released, and the interrupt routine 58 is ended in exit block 145.

The application program 54, running above interrupt handler 58 in coprocessor 28, tracks the usage of storage space within data buffer 49. When it appears necessary to regain the use of storage space taken by WCBs associated with video data segments which have already been transmitted, the application program 54 then asks the output DMA circuit 49 to issue an interrupt. This capability is needed because it is likely that too many WCBs will be handled without a need for an interrupt due to an error condition or due to a need to change line speed. When such an interrupt is issued, the needed storage space is returned by the operation of interrupt handler 58, as WCBs are moved from the in-process queue to the completed queue, and as data storage associated with WCBs in the new completed queue is returned for re-use.

Thus, the present invention provides a method for changing line speeds efficiently during the presentation of video data. Chaining allows the software to queue the WCBs and the hardware to process each of them. For each WCB, an interrupt option is provided. For each interrupt that is requested for a line speed change, the output DMA circuit 42 stops running. When such an interrupt occurs, interrupt handler 58 moves from the CDB portion of one WCB to the next without software interaction. Programming the output DMA circuit 42 to interrupt and stop on a line speed change provides a way of changing the line speed at interrupt time without idle time on the link. This is accomplished by providing line speed information in the CDB portion of the WCB. Associating a potential line speed change with each WCB also provides data independence, as the application program 54 does not need to know how much data must be transferred before a line speed change, which is instead accomplished in real time for a particular block of video data.

Referring to FIGS. 1 and 3, the application program 54, including device driver 55, run-time subroutine 56, and interrupt handler 58, is preferably supplied in the form of a removable computer readable medium 170, such as a diskette or compact disk, which is inserted into a DASD unit 21 equipped to read such a medium. After the application program 54 is loaded into video server 10, it is stored in a hardfile, such as DASD unit 20. Each time the server 12 is "booted," the application program 54 is sent through system bus 22 and CFE bus 32 to be loaded into card RAM memory 30, from which it is executed in coprocessor 28.

Figure 7:
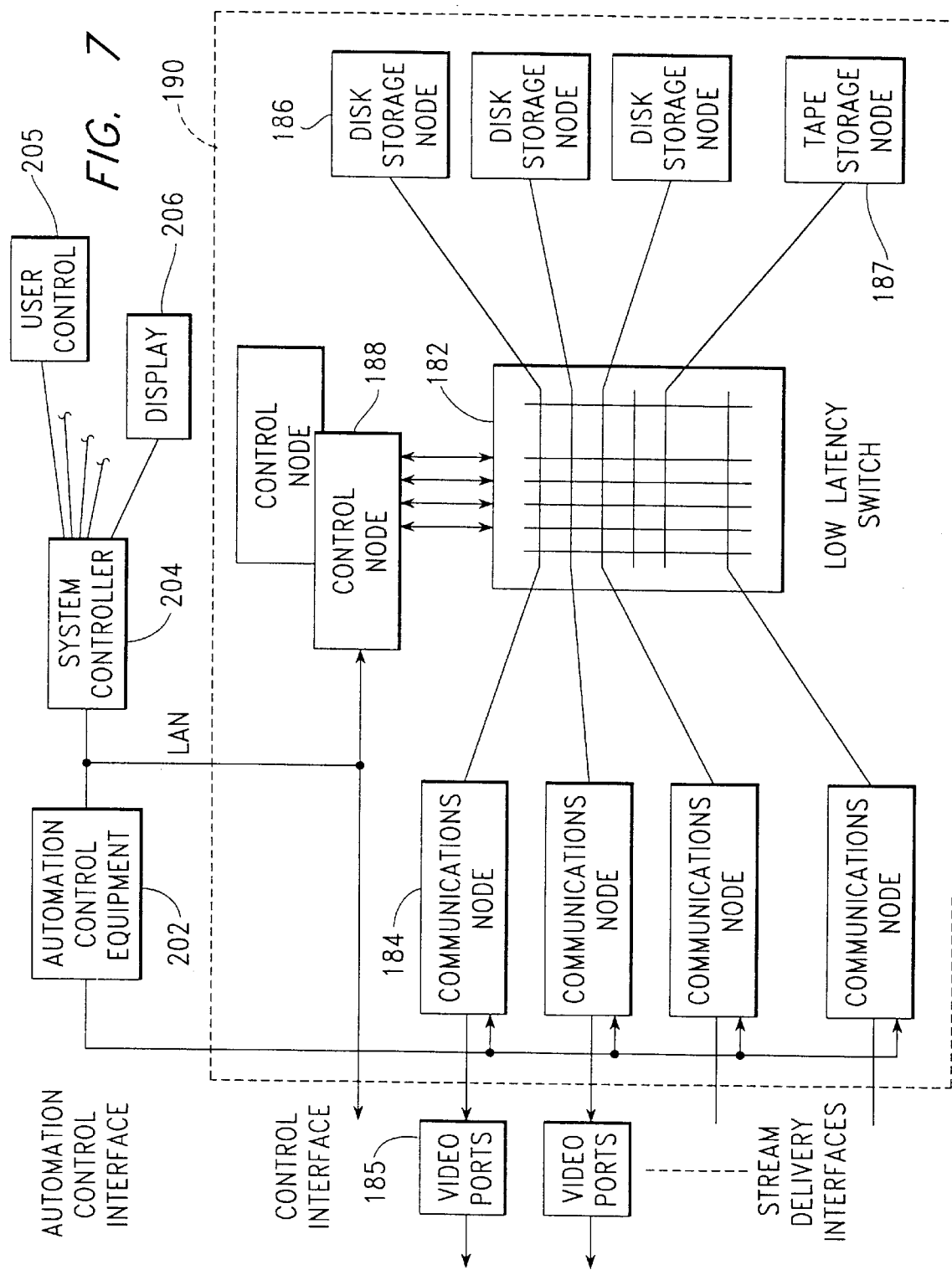
FIG. 7 is a schematic block diagram of a media streamer from a co-pending application, in which the present invention is applied.

FIG. 7 is a block diagram of a media streamer 180 from the co-pending application entitled "Video Optimized Media Streamer," as described above in "Cross Reference to a Related Application." This is an alternative type of system to which the process of the current invention may be applied. This system includes the following four architecturally distance components to provide scaleabiltiy, high availability, and configuration flexibility:

1) Low-Latency Switch 182—a hardware/microcode component with a primary task of delivering data and control information among Communication nodes 184, one or more Storage Nodes 186,187, and one or more Control Nodes 188.

2) Communication Node 184—a hardware/microcode component with the primary task of enabling the "playing" (delivering data isochronously) or "recording" (receiving data isochronously) over an externally-defined interface usually familiar to the broadcast industry, such as NTSC, PAL, D1, or D2. The digital-to-video interface is embodied in a video card contained in a plurality of video ports 185 connected at the output of each communication node 184.

3) Storage Node 186, 187—a hardware/microcode component with the primary task of managing a storage medium such as a disk and associated storage availability options.

4) Control Node 188—a hardware/microcode component with the primary task of receiving and executing control commands from an externally-defined subsystem interface familiar to the computer industry.

Information is transferred through the switch 182 in packets. Each packet contains a header portion that controls the switching state of individual crossbar switch points in each of the switch chips within the switch 182. The control node 188 provides the other nodes (storage nodes 186, 187 and communication nodes 184) with the information necessary to enable peer-to-peer operation via the low latency switch 182.

Figure 8:
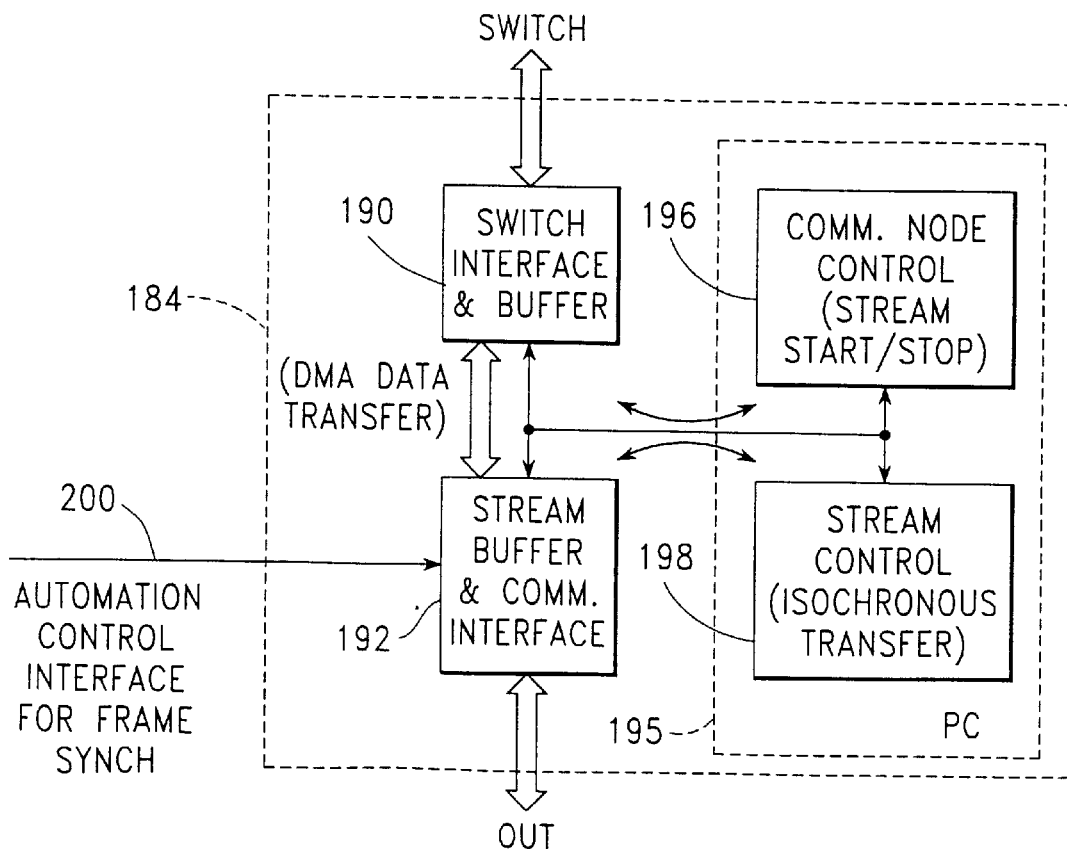
FIG. 8 is a schematic block diagram of a communications node in the media streamer of FIG. 7.

FIG. 8 is a block diagram showing internal components of a communications node 184 (shown in FIG. 7).

Referring to FIGS. 7 and 8, communications node 184 includes a switch interface and buffer module 190 which enables communications with the low latency switch 182. Video data is directly transferred between the switch interface and buffer module 190 to a stream buffer and communication interface 192 for transfer to a user terminal (not shown). A personal computer 195 includes software modules 196 and 198 which provide, respectively, communication node control (e.g., stream start/stop actions) and enable the subsequent generation of an isochronous stream of data. An additional input 200 to stream buffer and communication interface 192 enables frame synchronization of output data. That data is received from automation control equipment 202, which is, in turn, controlled by a system controller 204 that exerts overall operational control of the stream server 180.

Each control node 188 is configured as a personal computer and includes a switch interface module for interfacing with low latency switch 182. Each control node 188 responds to inputs from system controller 204 to provide information to the communication nodes 184 and storage nodes 186, 187, enabling desired interconnections to be created via the low latency switch 182. Furthermore, control node 188 includes software for enabling staging of requested data from one or more of disk storage nodes 186 and the delivery of the video data, via a stream delivery interface, to a user display terminal. Control node 188 further controls the operation of both tape and disk storage nodes 186, 187 via commands sent through low latency switch 182.

Referring to FIGS. 1, 7, and 8, in a preferred implementation of the present invention within the system of FIGS. 7 and 8, the personal computer 195 of FIG. 8 is configured generally as the video server of FIG. 1. The functions of the switch interface and buffer 190 of FIG. 8 are provided by a hard file DASD unit, such as DASD unit 20 of FIG. 1, while the functions of the stream buffer and communication interface 192 of FIG. 8 are provided within card RAM memory 30 of FIG. 1. Compressed video data is fed into the bus 22 of video server through a communications port (not shown). The application program 54 (of FIG. 3) generates WCBs as described above in reference to FIGS. 3 and 4, for video data structures which may be identical to the packets transferred through low latency switch 182, or which may be subportions of these packets.

The output from each communications node 184 is provided in the form of compressed video segments (i.e. in a non-isochronous mode), with the conversion from this compressed digital mode to the a standard television format, such as NTSC or PAL, being accomplished within the associated video port 185.

Thus, the present invention may be applied to a computing system operating as single video server, as discussed in reference to FIGS. 1–6, or to a computing system operating as a communications node within a much larger system. The single video server supplies video information in the form of compressed video segments, which may be presented at sequentially varying data rates. The larger system supplies video information in a television industry format, such as NTSC or PAL, with the internal transmission of data, between a communications node 184 and a video port 185 having sequentially variable data rate.

While the invention has been described in its preferred forms or embodiments with some degree of particularity, it is understood that this description has been given only by way of example and that numerous changes in the details of construction, fabrication and use, including the combination and arrangement of parts or process steps, may be made without departing from the spirit and scope of the invention.

What is claimed is:

1. A method for transmitting video data arriving in a plurality of digital video data segments including digitally encoded transmission speed information, wherein said video data segments arrive in a preferred sequence, and wherein said method comprises:

storing each said video data segment in said plurality thereof within a data buffer;

constructing a plurality of data structures, wherein each data structure within said plurality thereof corresponds to a video data segment within said plurality thereof, wherein each said data structure is stored in said data buffer, and wherein each said data structure includes a pointer to said video data segment corresponding therewith and a line speed code derived from said encoded transmission speed information of said video segment corresponding therewith;

reading information from each said data structure in an order corresponding to said preferred sequence of said video data segments with which said data structures correspond; and when a change in transmission line speed is required, as indicated by said line speed code within a particular data structure corresponding to a video data segment to be transmitted next, setting a variable speed clock to provide pulses timing transmission of said video data.

2. The method of claim 1:

wherein, after reading said information from each said data structure, each said data structure is chained into an in-progress queue awaiting transmission of said video data with which said data structure corresponds, with said transmission occurring under control of a memory access circuit accessing memory locations within said data buffer; and wherein, when said change in transmission line speed is required for a video data segment to which a particular data structure within said plurality thereof is associated, as indicated by said line speed code within said particular data structure, a first flag bit requesting an interrupt from said memory access circuit is written in said particular data structure;

wherein, when said first flag bit is encountered in a set condition during operation of said memory access circuit, said interrupt is issued, and an interrupt handler is started;

wherein said interrupt handler determines from said line speed code within said particular data structure whether a line speed change is required; and wherein, when said interrupt handler determines that a line speed change is required, said variable speed clock is set.

3. The method of claim 2:

wherein, when said change in transmission line speed is required for a video data segment to a which a particular data structure within said plurality thereof is associated, as indicated by said line speed code within said particular data structure, a second flag bit requesting that said memory access circuit be disabled to prevent transmission of said video data segment is also written in said particular data structure;

wherein, when said second flag bit is encountered in a set condition during operation of said memory access circuit, said memory access circuit is disabled to prevent transmission of said video data segment to which said particular data structure is associated; and wherein, after setting said variable speed clock, said interrupt handler enables said memory access circuit to permit transmission of said video data segment to which said particular data structure is associated.

4. The method of claim 3, wherein said first and second flag bits form part of a control word within said data structure, with said control word being written into a register of said memory access circuit to prepare for transmission of said video data structure with which said particular data structure is associated.

5. The method of claim 1:

wherein said line speed code is set to a first value when said video data segment with which said data structure is associated is to be transmitted at a line speed identical to that of an immediately preceding video data structure, to a second value when said video data segment with which said data structure is associated is to be transmitted at a first line speed, and to a third value when said video data segment with which said data structure is associated is to be transmitted at a second line speed; and wherein, when said line speed code is set to a value other than said first value, said line speed code indicates a need to change line speed with transmission of said data structure.

6. The method of claim 2, wherein said method additionally comprises determining if said memory access circuit is not running to transmit video data segments, and, when said memory access circuit is not running:

setting a pointer to a start of said in-progress queue to said data structure;

reading data from said data structure by said memory access circuit;

setting said variable speed clock to a line speed indicated by said line speed code within said data structure; and starting said memory access circuit to transmit video data segments.

7. A method for transmitting video data arriving in first and second pluralities of digital video data segments including digitally encoded transmission speed information, wherein video data segments in said first plurality thereof arrive in a first preferred sequence for transmission through a first output port, wherein video data segments in said second plurality thereof arrive in a second preferred sequence for transmission through a second output port, and wherein said method comprises:

storing each said video data segment in said first and second pluralities thereof within a data buffer;

constructing first and second pluralities of data structures, wherein each data structure within said first plurality thereof corresponds to a video data segment within said first plurality thereof, wherein each data structure within said second plurality thereof corresponds to a video data segment within said second plurality thereof, wherein each said data structure is stored in said data buffer, and wherein each said data structure includes a pointer to said video data segment corresponding therewith and a line speed code derived from said encoded transmission speed information of said video segment corresponding therewith;

reading information from each said data structure within said first plurality thereof in an order corresponding to said first preferred sequence of said video data segments with which said data structures correspond, while information from each said data structure within said second plurality thereof is read in an order corresponding to said second preferred sequence of said video data segments with which said data structures correspond;

when a change in transmission line speed through said first output port is required, as indicated by said line speed code within a particular said data structure within said first plurality thereof, setting a first variable speed clock to provide pulses timing transmission of said video data as a particular said video data segment corresponding to said particular said data structure within said first plurality thereof is transmitted; and when a change in transmission line speed through said second output port is required, as indicated by said line speed code with a particular said data structure within said second plurality thereof, setting a second variable speed clock to provide pulses timing transmission of said video data as a particular said video data segment corresponding to said particular data structure within said second plurality thereof is transmitted.

8. The method of claim 7:

wherein, after reading said information from each said data structure within said first plurality thereof, each said data structure is chained into a first in-progress queue awaiting transmission of said video data with which said data structure corresponds through said first output port, with said transmission occurring under control of a memory access circuit accessing memory locations within said data buffer;

wherein, after reading said information from each said data structure within said second plurality thereof, each said data structure is chained into a second in-progress queue awaiting transmission of said video data with which said data structure corresponds through said second output port, with said transmission occurring under control of a memory access circuit accessing memory locations within said data buffer; and wherein, when said change in transmission line speed is required for a video data segment to which a particular data structure is associated, as indicated by said line speed code within said particular data structure, a first flag bit requesting an interrupt from said memory access circuit is written in said particular data structure;

wherein, when said first flag bit is encountered in a set condition during operation of said memory access circuit, said interrupt is issued, and an interrupt handler is started;

wherein said interrupt handler determines from said line speed code within said particular data structure whether a line speed change is required;

wherein, when said interrupt handler determines that a line speed change is required by said line speed code from a data structure within said first plurality thereof, said first variable speed clock is set; and wherein, when said interrupt handler determines that a line speed change is required by said line speed code from a data structure within said second plurality thereof, said second variable speed clock is set.

9. The method of claim 8:

wherein, when said change in transmission line speed is required for a particular video data segment to a which a particular data structure is associated, as indicated by said line speed code within said particular data structure, a second flag bit requesting that said memory access circuit be disabled to prevent transmission of said video data segment is also written in said particular data structure;

wherein, when said second flag bit is encountered in a set condition during operation of said memory access circuit, said memory access circuit is disabled to prevent transmission of said particular video data segment to which said particular data structure is associated; and wherein, after setting said first or second variable speed clock, said interrupt handler enables said memory access circuit to permit transmission of said particular video data segment to which said particular data structure is associated.

10. The method of claim 9, wherein said first and second flag bits form part of a control word within said data structure, with said control word being written into a register of said memory access circuit to prepare for transmission of said video data structure with which said particular data structure is associated.

11. The method of claim 7:

wherein said line speed code is set to a first value when said video data segment with which said data structure is associated is to be transmitted at a line speed identical to that of an immediately preceding video data structure, to a second value when said video data segment with which said data structure is associated is to be transmitted at a first line speed, and to a third value when said video data segment with which said data structure is associated is to be transmitted at a second line speed; and wherein, when said line speed code is set to a value other than said first value, said line speed code indicates a need to change line speed with transmission of said data structure.

12. The method of claim 8, wherein said method additionally comprises determining if said memory access circuit is not running to transmit video data segments, and, when said memory access circuit is not running:

when said data structure is within said first plurality thereof, setting a pointer to a start of said first in-progress queue to said data structure, reading data from said data structure by said memory access circuit, and setting said first variable speed clock to a line speed indicated by said line speed code within said data structure, and starting said memory access circuit to transmit video data segments; and when said data structure is within said second plurality thereof, setting a pointer to a start of said second in-progress queue to said data structure, reading data from said data structure by said memory access circuit, and setting said second variable speed clock to a line speed indicated by said line speed code within said data structure, and starting said memory access circuit to transmit video data segments.

13. A method for determining line speeds at which individual video data segments in a plurality thereof are transmitted under control of a memory access circuit, wherein each said video data segment has associated therewith a data structure including a line speed code indicating a preferred line speed at which said video data segment is to be transmitted, wherein said video data segments are to be transmitted in a preferred sequential order, and wherein said method comprises:

reading said line speed code from said data structure, with said line speed codes being read in an order corresponding to said preferred sequential order of video data segments associated therewith;

when said line speed code indicates a change in line speed is required, setting an interrupt bit within said data structure;

chaining said data structure into an in-progress queue;

reading data from a data structure in said in-progress queue by said memory access circuit;

when said interrupt bit has not been set, transmitting said video data segment with which said data structure is associated at a previously-established line speed;

when said interrupt bit has been set, starting an interrupt handler subroutine which determines whether a line speed change is required, which sets a variable speed clock to effect said line speed change when required, and which subsequently starts said memory access circuit to transmit said video data segment.

14. A method for determining line speeds at which individual video data segments in first and second pluralities thereof are transmitted under control of a memory access circuit, wherein each said video data segment in said first plurality thereof has associated therewith a data structure in a first plurality thereof, wherein each said video data segment in said second plurality thereof has associated therewith a data structure in a second plurality thereof, wherein each said data structure includes a line speed code indicating a preferred line speed at which said video data segment is to be transmitted, wherein said video data segments within said first plurality thereof are to be transmitted through a fist output port in a first preferred sequential order, wherein said video data segments within said second plurality thereof are to be transmitted through a second output port in a second preferred sequential order and wherein said method comprises:

reading said line speed code from said data structure, with said line speed codes from data structures in said first plurality thereof being read in an order corresponding to said first preferred sequential order of video data segments associated therewith, and with said line speed codes from data structures in said second plurality thereof being read in an order corresponding to said second preferred sequential order of video data segments associated therewith;

when said line speed code indicates a change in line speed is required, setting an interrupt bit within said data structure;

when said data structure is in said first plurality thereof, chaining said data structure in a first in-progress queue;

when said data structure is in said second plurality thereof, chaining said data structure in a second in-progress queue;

reading data from a data structure in said first and second in-progress queues by said memory access circuit;

when said interrupt bit has not been set, transmitting said video data segment with which said data structure is associated at a previously-established line speed; and when said interrupt bit has been set, starting an interrupt handler subroutine which determines whether a line speed change is required, which sets a variable speed clock to effect said line speed change when required, and which subsequently starts said memory access circuit to transmit said video data segment.

15. A method for preparing a data structure to convey a need to change a line speed of a transmission channel along which a video data segment associated with said data structure is transmitted, wherein said data structure is included in a plurality of data structures stored within a data buffer, wherein addresses of data structures within said plurality thereof are stored in a FIFO buffer in an order corresponding to a preferred order in which said video data segments associated therewith are to be transmitted along said transmission channel, and wherein said process comprises the steps of:

(a) receiving an address of said data structure from said FIFO buffer;

(b) reading control data of said data structure stored at said address;

(c) when an interrupt request is within said control data, setting an interrupt bit within a channel control word within said data structure;

(d) when a speed change is required, as determined by examining said write control speed data, setting said interrupt bit within said channel control word and setting a bit to disable operation of a memory access circuit subsequently reading said data structures in said data buffer;

(e) writing said channel control word into a channel descriptor block within said data structure;

(f) chaining said data structure into an in-progress queue associated with said transmission channel; and (g) waiting to receive another address of another data structure from said FIFO buffer.

16. The method of claim 15, additionally comprising, between steps (e) and (f,), the steps of:

determining if a memory access circuit accessing said data structures within said data buffer to control transmission of video data segments associated with said data structures has been turned on; and when said memory access circuit has not been turned on, writing said channel control word to a register of said memory access circuit, setting a variablespeed clock providing pulses timing transmission of data along said transmission channel; setting a pointer to a start of said in-progress circuit to said data structure, and turning on said memory access circuit.

17. A method for setting a speed of a variable-speed clock providing pulses timing transmission of a plurality of video data segments along a transmission channel, wherein each video data segment within said plurality thereof is stored in a data buffer, wherein each video data segment in said plurality thereof is associated with a data structure including a channel control word, wherein each said video data segment has a line speed code indicating the and wherein said process comprises the steps of:

(a) reading said channel control word into a register of a memory access circuit;

(b) when said channel control word contains a bit disabling said memory access circuit, stopping said memory access circuit while holding said channel control word in said register thereof;

(c) when said channel control word contains a bit requesting an interrupt, issuing an interrupt from said memory access circuit;

(d) when said interrupt is issued, determining if a previous operation has been stopped before completion;

(e) when said previous operation has been stopped before completion, handling an error interrupt;

(f) when said previous operation has not been stopped before completion, determining if a new line speed is needed from said line speed code in said data structure;

(g) when a new line speed is needed, setting said variable speed clock according to said line speed code and starting said memory access circuit;

(h) when a new line speed is not needed, determining if said memory access circuit is running; and (i) if said memory access circuit is not running, starting said memory access circuit.

18. A medium having written thereon in a computer readable form a subroutine downloadable to execute in the co-processor of a communications card, for preparing a data structure to convey a need to change a line speed of a transmission channel along which a video data segment associated with said data structure is transmitted, wherein said data structure is included in a plurality of data structures stored within a data buffer, wherein addresses of data structures within said plurality thereof are stored in a FIFO buffer in an order corresponding to a preferred order in which said video data segments associated therewith are to be transmitted along said transmission channel, and wherein said subroutine includes the steps of:

(a) waiting to receive an address of a data structure;

(b) reading control data of said data structure stored at said address;

(c) when an interrupt request is within said control data, setting an interrupt bit within a channel control word within said data structure;

(d) when a speed change is required, as determined by examining said write control speed data, setting said interrupt bit within said channel control word and setting a bit to disable operation of a memory access circuit subsequently reading said data structures in said data buffer;

(e) writing said channel control word into a channel descriptor block within said data structure;

(f) chaining said data structure into an in-progress queue associated with said transmission channel; and (g) waiting to receive another address of another data structure from said FIFO buffer.

19. The computer readable medium of claim 18, wherein said subroutine additionally comprises, between steps (e) and (f,), the steps of:

determining if a memory access circuit accessing said data structures within said data buffer to control transmission of video data segments associated with said data structures has been turned on; and when said memory access circuit has not been turned on, writing said channel control word to a register of said memory access circuit, setting a variablespeed clock providing pulses timing transmission of data along said transmission channel; setting a pointer to a start of said in-progress circuit to said data structure, and turning on said memory access circuit.

20. The computer readable medium of claim 19, having additionally written thereon an interrupt handler to execute in the co-processor of a communications card, wherein said interrupt handler includes the steps of:

(a) reading said channel control word into a register of a memory access circuit;

(b) when said channel control word contains a bit disabling said memory access circuit, stopping said memory access circuit while holding said channel control word in said register thereof;

(c) when said channel control word contains a bit requesting an interrupt, issuing an interrupt from said memory access circuit;

(d) when said interrupt is issued, determining if a previous operation has been stopped before completion;

(e) when said previous operation has been stopped before completion, handling an error interrupt;

(f) when said previous operation has not been stopped before completion, determining if a new line speed is needed from said line speed code in said data structure;

(g) when a new line speed is needed, setting said variable speed clock according to said line speed code and starting said memory access circuit;

(h) when a new line speed is not needed, determining if said memory access circuit is running; and (i) if said memory access circuit is not running, starting said memory access circuit.

* * * * *